United States Patent [19]

Cornell

[11] 4,075,903
[45] Feb. 28, 1978

[54] ADJUSTABLE STEERING COLUMN

[75] Inventor: Thomas G. Cornell, Danville, Ky.

[73] Assignee: Eaton Corporation, Cleveland, Ohio

[21] Appl. No.: 723,257

[22] Filed: Sep. 14, 1976

[51] Int. Cl.² .................. B62D 1/18; G05G 5/16; G05G 5/18

[52] U.S. Cl. .................. 74/493; 74/527; 74/529; 74/531

[58] Field of Search .......... 74/493, 527, 529, 531; 192/53 B

[56] References Cited

U.S. PATENT DOCUMENTS

| | | | |
|---|---|---|---|
| 727,390 | 5/1903 | Leikem | 192/53 B |
| 887,701 | 5/1908 | Schoening | 74/493 |
| 2,589,554 | 3/1952 | Killian | 74/527 X |
| 3,533,302 | 10/1970 | Hansen | 74/493 |
| 3,678,778 | 7/1972 | Groves | 74/493 |
| 3,955,439 | 5/1976 | Meyer | 74/493 |

Primary Examiner—Allan D. Herrmann
Attorney, Agent, or Firm—J. R. Teagno

[57] ABSTRACT

An adjustable vehicular steering column utilizing telescopic support members, which are not coaxial with respect to the steering column, permitting infinite adjustment between predetermined limits. A releasably engageable locking mechanism is provided to apply a clamping force on the telescopic support members when the steering wheel is properly positioned by the vehicle operator. An auxiliary locking mechanism is provided as a safeguard in case the main locking mechanism fails.

15 Claims, 6 Drawing Figures

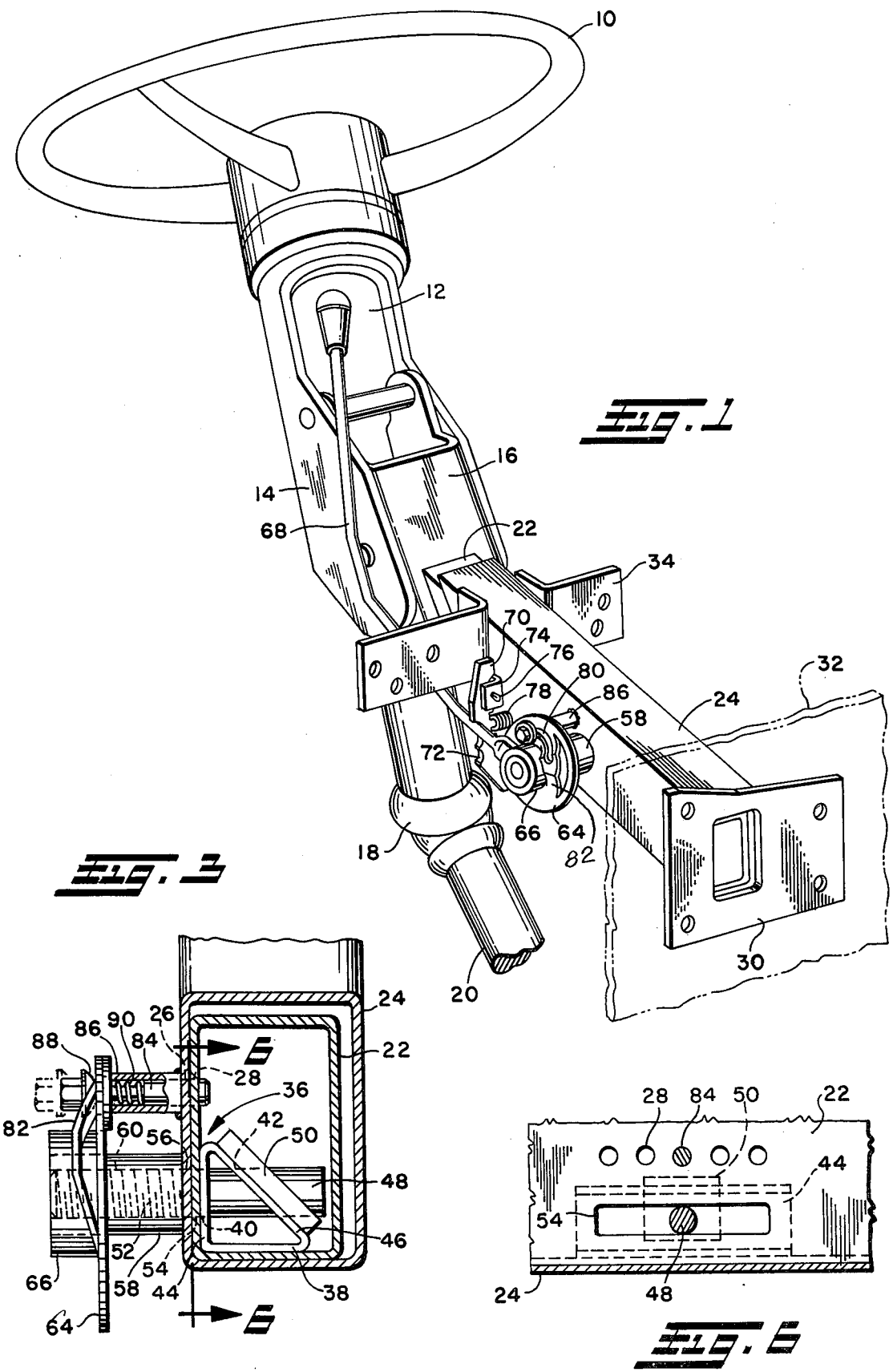

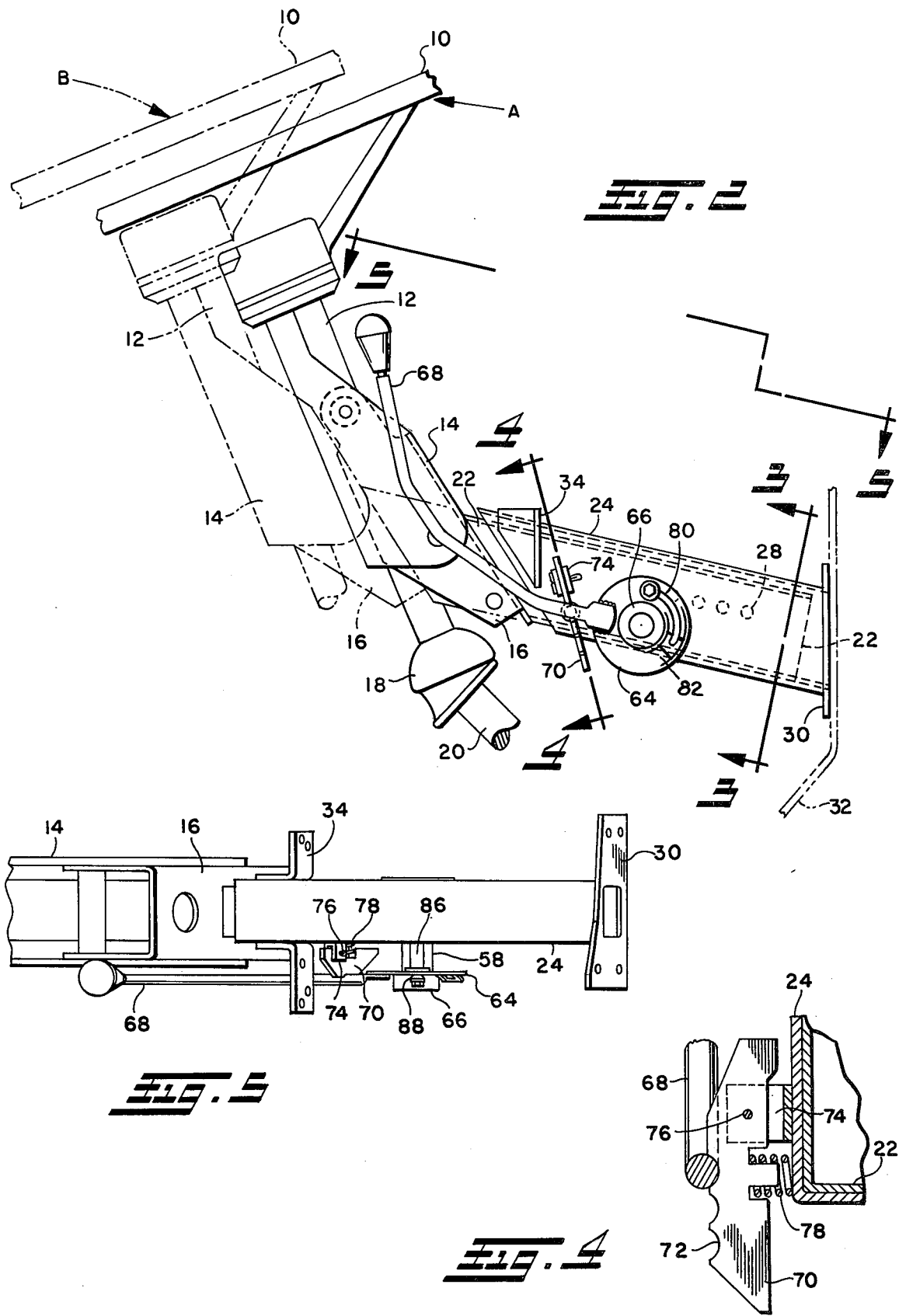

ADJUSTABLE STEERING COLUMN

BACKGROUND OF THE INVENTION

1. Field of the Invention

This invention relates to adjustable steering columns for vehicles, and more particularly to steering columns which permit infinite adjustment thereof.

2. Description of the Prior Art

Various methods have been utilized for adjustment of steering columns in vehicles. One of the most common methods is the tiltable steering column wherein the angle of the column with respect to the horizontal is varied to obtain the desired position of the steering wheel. Other methods have utilized telescopic steering columns wherein the steering column is coaxial with the telescopic support member. As in the tiltable designs, these telescopic steering columns are installed at a slight angle relative to the horizontal so that adjustment of the column results in displacement of the steering wheel within the vehicle. Both of these methods are acceptable in applications where the steering column can be at a slight angle to the horizontal, however, in many commercial applications, the steering columns are arranged nearly vertically. In such commercial applications, the tiltable steering column cannot be utilized and the telescopic steering column would result in vertical movement and awkward positioning of the steering wheel. Thus, an adjustable steering column wherein the steering column is not coaxial with the telescopic support members is required in such installations. Such adjustable steering columns exist, however, the number of positions in which the steering wheel can be positioned is limited. Because of this disadvantage, it has become desirable to find an adjustable steering column which is infinitely adjustable between fixed limits and which can be used in applications where the steering column is not coaxial with the telescopic support members.

SUMMARY OF THE INVENTION

The present invention provides a solution to the problem of proper positioning of a steering wheel in those applications where the steering column is not coaxial with the telescopic support members.

An improved adjustable steering column is disclosed. The column is constructed so that the steering column is not coaxial with the telescopic support member. The column is connected to an inner telescopic member which is received in an outer telescopic member and is movable therein. The position of the steering wheel is infinitely variable between predetermined limits and is adjustable by moving the inner telescopic member within the outer telescopic member. A locking mechanism is provided to apply a clamping force on the inner and outer telescopic members after the steering wheel has been properly positioned by the vehicle operator. Means are provided to insure that the locking mechanism is retained in the clamped position until the vehicle operator changes the position of the steering wheel. An auxiliary locking mechanism is also provided to limit the axial movement of the inner telescopic member relative to the outer telescopic member in case the main locking mechanism fails.

Accordingly, it is an object of the present invention to provide a steering column that is infinitely adjustable between predetermined limits.

Another object of the present invention is to provide a steering column that is infinitely adjustable between predetermined limits wherein the steering column is not coaxial with the telescopic support members.

A further object of the present invention is to provide a steering column that is infinitely adjustable between predetermined limits wherein the locking mechanism applies a clamping force on the inner and outer telescopic support members.

Still another object of the present invention is to provide a steering column that is infinitely adjustable between predetermined limits and which utilizes an auxiliary locking mechanism which is operable if the main locking mechanism fails.

These and other objects and advantages of the present invention will become apparent from the following detailed description taken in connection with the accompanying drawings.

BRIEF DESCRIPTION OF THE DRAWINGS

FIG. 1 is a perspective view of a vehicle adjustable steering column constructed in accordance with this invention.

FIG. 2 is a side elevational view of the mechanism shown in FIG. 1.

FIG. 3 is a cross-sectional view taken along lines 3—3 of FIG. 2 to illustrate the locking mechanism utilized.

FIG. 4 is a cross-sectional view taken along lines 4—4 of FIG. 2 to illustrate the means utilized to retain the lever arm in the locked position.

FIG. 5 is a plan view taken along lines 5—5 of FIG. 2.

FIG. 6 is a cross-sectional view taken along lines 6—6 of FIG. 3 to illustrate the position of the apertures in the inner tubular member.

DESCRIPTION OF THE PREFERRED EMBODIMENT

Referring now to the drawings, FIG. 1 shows in perspective the preferred embodiment of this invention. In this Figure, a steering wheel 10 for a vehicle is supported on a device allowing its displacement by the driver of the vehicle. The steering wheel 10 is connected to a steering shaft 12 which is rotatably supported by a support member 14 which has a generally channel shaped configuration. A channel-shaped member 16 is connected to support member 14 and encloses the forward side of the steering shaft 12 which is furthest from the vehicle operator. A universal joint 18 is connected to the lower end of steering shaft 12 and is used as a connection between the steering shaft 12 and a steering shaft assembly 20.

Support member 16 is connected to tubular inner member 22 which has a generally box-shaped configuration. Tubular inner member 22 is slidably received within a stationary tubular outer member 24 which also has a generally box-shaped configuration. Outer member 24 also has a flanged end 30 which is bolted to the fire wall 32 of the vehicle cab. Attachment flanges 34 are attached to the other end of outer member 24 and are secured to the vehicle's instrument panel.

Tubular inner member 22 has a series of apertures 28 formed in a wall thereof, as shown in FIG. 6. Also formed on the same wall of inner member 22 is an elongated aperture 54, the length of which determines the maximum axial movement of inner member 22 relative to outer member 24. As shown on FIG. 3, outer member 24 contains apertures 26 and 56 which are alignable with apertures 28 and 54, respectively.

Also illustrated in FIG. 3 is a locking mechanism 36 which is provided to lock the position of inner member 22 relative to outer member 24. Mechanism 36 includes an inner locking member 38 which is received in inner member 22 and is positioned therein so as to contact two adjacent walls of inner member 22. Locking member 38 is triangular in cross section and has apertures 40 and 42 provided in its respective walls 44 and 46. A locking bolt 48 having a bearing plate 50 attached to one end thereof and a threaded portion 52 at the other end thereof is provided. The bearing plate 50 is attached to the locking bolt 48 at an acute angle corresponding to the acute angle between walls 44 and 46 of inner locking member 38. The locking bolt 48 is received through apertures 40 and 42 provided in the walls of inner locking member 38 and through apertures 54 and 56 provided in the walls of inner member 22 and outer member 24, respectively, so that the threaded portion 52 is exterior to outer member 24. Bearing plate 50 is positioned so as to be in firm contact with wall 46 of inner locking member 38. A tubular sleeve 58 having internal threads 60 is received on and is in threaded engagement with threaded portion 52 of locking bolt 48. Internal threads 60 are of the same pitch as the pitch of threaded portion 52 but are known in the art as double threads which results in twice the axial displacement of tubular sleeve 58 relative to threaded portion 52 when tubular sleeve 58 is rotated than if a single thread configuration were used for internal threads 60. The purpose for this double thread will be explained later.

Tubular sleeve 58 is connected to a locking disc 64 and a hub 66. Also attached to locking disc 64 is a lever arm 68, as shown in FIG. 2 which is used to rotate the locking disc 64. When in the locked position, lever arm 68 is retained by a holding arm 70 with detents 72 provided thereon, as shown on FIG. 4. Holding arm 70 is connected to outer member 24 by means of a flange 74 welded to outer member 24 and a pin 76, and is biased by a spring 78 so that one of detents 72 engages lever arm 68 when the inner member 22 and outer member 24 are clamped together.

If the position of the steering wheel 10 must be adjusted, the vehicle operator moves the lever arm 68 angularly downward which disengages the lever arm 68 from the holding arm 70. Since internal threads 60 are double threads, the angular displacement of lever arm 68 is one-half that which would be required if standard single threads were utilized. This is a very desirable feature since it substantially reduces the movement required of the vehicle operator in adjusting the position of the steering wheel 10. When the lever arm 68 is in the downward position, no clamping force is applied to the inner member 22 and outer member 24 by the inner locking member 38 and the tubular sleeve 58, permitting the vehicle operator to adjust the position of steering wheel 10. As shown in FIG. 2 the steering wheel 10 can be positioned anywhere between its forward position, identified by reference letter A, and its rearward position, as shown by reference letter B. Thus, the position of the steering wheel 10 is infinitely adjustable between these positions. After adjusting the steering wheel 10 to the desired position, the vehicle operator moves the lever arm 68 angularly upward which reapplies the clamping force to the inner member 22 and the outer member 24 by means of the inner locking member 38 and the tubular sleeve 58. When the clamping force has been reapplied, lever arm 68 will be so positioned so as to engage one of the detents 72 provided on holding arm 70. Such engagement prevents the lever arm 62 from any undesired angular movement due to vehicle vibration.

Also provided on locking disc 64 is an elongatged angular slot 80, as shown on FIG. 1. Adjacent slot 80 is a ramp surface 82, shown on FIG. 3. A pin 84 is received in slot 80 and extends into a sleeve 86 attached to outer member 24 and into aperture 26 in outer member 24. If there is alignment between aperture 26 and one of the apertures in the series of apertures 28, pin 84 will also extend into aperture 28. Pin 84 is positioned in slot 80 and is positioned so that the head 88 of pin 84 is in contact with ramp surface 82. A spring 90 is provided to bias pin 84 so as to contact ramp surface 82. As the vehicle operator moves lever arm 68 to the downward position, locking disc 64 rotates which causes pin 84 to move up the ramp surface 82, As pin 84 moves up ramp surface 82, it also moves transversely outward an amount sufficient to provide clearance between the pin 84 and inner member 22 permitting the vehicle operator to adjust the position of the steering wheel 10. As the vehicle operator returns the lever arm 68 to the upward position after adjusting the position of the steering wheel 10, the pin 84 moves down the ramp surface 82. If pin 84 is in alignment with one of the apertures in the series of apertures 28 provided in inner member 22, the pin 84 will be received in the aperture and the head 88 of the pin 84 will remain in firm contact with the ramp surface 82 as the lever arm 68 is moved to its locked upright position. In this case, the pin 84 provides a further locking means in that it prevents any axial movement of the inner member 22 relative to the outer member 24 if the locking mechanism 36 should fail. If, however, the pin 84 is not aligned with any of the apertures in the series of apertures 28, pin 84 will remain in its transversely outward position as lever arm 68 is returned to its locked upright position since pin 84 will be in contact with inner member 22. In this case, if the locking mechanism 36 should fail, relative axial movement between the inner member 22 and outer member 24 will be limited since, as soon as aperture alignment occurs, pin 84 will snap into one of the apertures in the series of apertures 28. Thus, axial movement between the inner member 22 and the outer member 24 is limited to a very small distance, if any, in case of locking mechanism failure.

Variations of the present invention will be apparent to those having ordinary skill in the art and the invention is limited only by the spirit and scope of the following claims.

I claim:

1. An adjustable steering column for a vehicle comprising:
   an outer tubular member adapted to be secured to the body of said vehicle;
   an inner tubular member received in said outer tubular member and axially movable therein in a telescoping relationship; and
   means operable upon actuation by the vehicle operator for clamping said inner member to said outer member, said clamping means comprising a first retaining means received in the interior of said inner member, a second retaining means mounted on the exterior of said outer member, and fastening means received through said inner and outer members to operatively connect said first and second retaining means, wherein movement of said movable means from said first position to said second position causes a clamping force to be applied to said inner and outer members, said clamping force being released by movement of said movable means from said second position to said first position.

2. An adjustable steering column for a vehicle as defined in claim 1 in which said tubular members are rectangular in cross section and in which said first retaining means includes at least two adjacent wall portions engageable with adjacent wall portions of said inner rectangular tubular member.

3. An adjustable steering column for a vehicle as defined in claim 1, wherein said clamping means includes auxiliary fastening means operable to prevent axial movement of said inner member relative to said outer member when said clamping force decreases to a predetermined level.

4. An adjustable steering column for a vehicle as defined in claim 3, wherein said auxiliary fastening means includes alignable apertures formed in said inner and outer members, pin means received in said alignable aperture in said outer member, and biasing means urging said pin means into engagement with a corresponding aperture in said inner member upon alignment thereof.

5. An adjustable steering column for a vehicle as defined in claim 4, wherein said auxiliary fastening means includes a locking member having an elongated aperture therein with said pin means received therein, said locking member being rotatable to move said pin means in direction outwardly of said apertures in said inner member thereby permitting said inner member to be moved axially relative to said outer member.

6. An adjustable steering column for a vehicle as defined in claim 5, wherein said locking member has cam means formed thereon adjacent said elongated aperture, said cam means contacting said pin means causing said pin means to move in a direction outwardly of said inner member when when said locking member is moved from said second position to said first position.

7. An adjustable steering column for a vehicle as defined in claim 1, wherein said movable means includes lever means operatively connected to said inner member, wherein movement of said lever means from said first position to said second position causes a clamping force to be applied to said inner and outer members and movement of said lever means from said second position to said first position causes said clamping force to be released.

8. An adjustable steering column for a vehicle as defined in claim 7, wherein said movable means includes means for retaining said lever arm in said second position.

9. An adjustable steering column for a vehicle as defined in claim 8, wherein said retaining means includes biasing means urging said retaining means into engagement with said lever means.

10. An adjustable steering column for a vehicle comprising:
an outer tubular member adapted to be secured to the body of said vehicle;
an inner tubular member received in said outer tubular member and axially movable therein in a telescoping relationship;
means operable upon actuation by the vehicle operator for clamping said inner member to said outer member, said clamping means including means movable between a first position permitting axial movement of said inner member relative to said outer member for infinite adjustment between predetermined limits of said inner member relative to said outer member and a second position applying a clamping force thereto for preventing relative movement between said inner member and said outer member; and,
auxiliary fastening means operable to prevent axial movement of said inner member relative to said outer member when said clamping force decreases to a predetermined level.

11. An adjustable steering column for a vehicle as defined in claim 10, wherein said auxiliary fastening means includes alignable apertures formed in said inner and outer members, pin means received in said alignable aperture in said outer member, and biasing means urging said pin means into engagement with a corresponding aperture in said inner member upon alignment thereof.

12. An adjustable steering column for a vehicle as defined in claim 11, wherein said auxiliary fastening means includes a locking member pivotally attached to said outer member and having an elongated aperture therein with said pin means received therein, said locking member being rotatable to move said pin means in a direction outwardly of said aperture in said inner member thereby permitting said inner member to be moved axially relative to said outer member.

13. An adjustable steering column for a vehicle as defined in claim 12, wherein said locking member has cam means formed thereon adjacent said elongated aperture, said cam means contacting said pin means causing said pin means to move in a direction outwardly of said inner member when said locking member is moved from said second position to said first position.

14. An adjustable steering column for a vehicle as defined in claim 10, wherein said movable means includes lever means operatively connected to said inner member, wherein movement of said lever means from said first position to said second position causes a clamping force to be applied to said inner and outer members and movement of said lever means from said second position to said first position causes said clamping force to be released.

15. An adjustable steering column for a vehicle as defined in claim 14, wherein said movable means includes means for retaining said lever means in said second position and biasing means urging said retaining means into engagement with said lever means.

* * * * *